3,227,940
VOLTAGE SENSITIVE CONTROL CIRCUIT
Elliott M. Gilbert and Meyer Stephen Blosser, Lynchburg, Va., assignors to General Electric Company, a corporation of New York
Filed Jan. 2, 1962, Ser. No. 163,450
3 Claims. (Cl. 321—11)

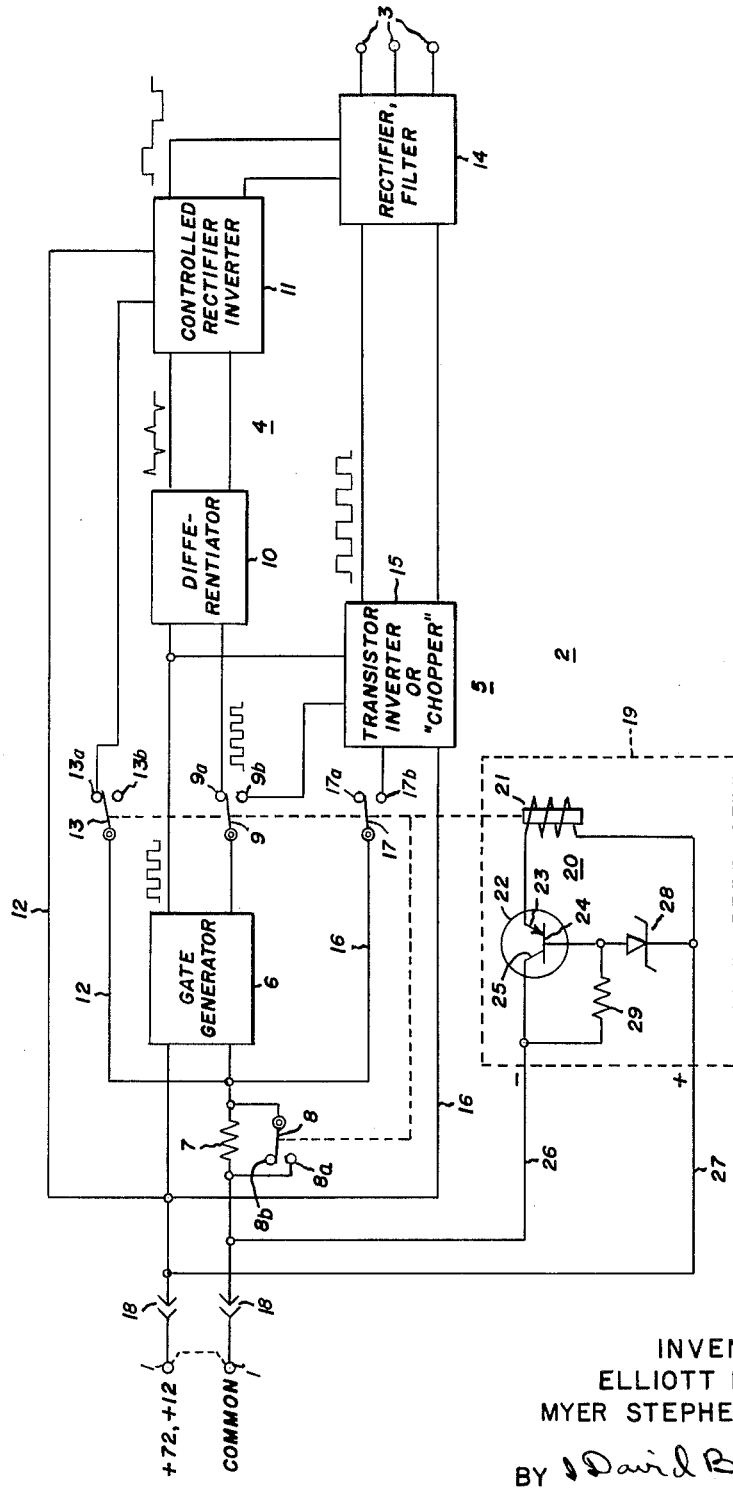

This invention relates to a voltage sensitive control circuit useful generally with power supplies. More particularly, the invention relates to a power supply which may be operated from substantially different supply voltages and which includes an over-voltage protective device to prevent damage to various circuit components.

While the invention is not limited thereto, it is particularly applicable to, and will be described in connection with, a power supply unit for use in railroad service.

In railroad communication systems, it is often desirable to provide two-way radio communication between the locomotive and other portions of a moving train such as the caboose or the locomotive and the trackside dispatcher. Since the radio equipment of which the power supply forms a part must therefore be installed in a number of different locations, all of which may have different supply voltages, the power supply must be able to operate from either the 72 volt D.C. primary power of the diesel locomotive or the 12 volts present at the other locations. Such supplies, therefore, customarily include separate high and low voltage inverter circuits specially designed for use with the 72 or 12 volt D.C. sources respectively. These inverter circuits use solid state components such as transistors and controlled rectifiers to invert the D.C. supply voltage to an alternating voltage which is rectified to provide the supply voltage for the radio units.

The individual high and low voltage inverters are manually switched into operation depending on the type of supply voltage present at the utilization point. As a result, the danger always exists that a 72 volt D.C. source will be inadvertently applied to the 12 volt low voltage inverter subjecting it to a substantial over-voltage. Since many of the circuit components, and particularly transistors, can be seriously damaged by over-voltages, the entire inverter is often subject to damage or destruction immediately upon installation.

It is therefore an object of this invention to provide a power supply capable of operating from different input voltages and which is automatically protected against over-voltages.

Another object of this invention is to provide a power supply capable of operating from two different voltages wherein the proper inverter circuit is always made operational;

Yet another object of this invention is to provide a novel sensing and control circuit which operates in response to the applied D.C. input voltage to control the selected inverter circuit.

Other objects and advantages of the instant application will become apparent as the description thereof proceeds.

In one form of the invention, a voltage sensitive relay forms part of a control circuit which is operative in response to the input voltage level. The relay selectively connects and disconnects the respective inverter circuits in response to the level of input voltage to prevent the high voltage from ever being applied to the low voltage inverter. The voltage sensitive relay includes a combination of a transistor switching circuit and a relay coil. If the input voltage is above a preset level, the transistor is turned off and the relay coil de-energized. With the coil de-energized the high voltage inverter is placed in the operative condition and the low voltage inverter positively disabled. In this manner, whenever the power supply is connected to the power source, the high voltage inverter is always in the operative condition thereby eliminating any possibility of the high voltage being applied to the low voltage inverter. If the applied voltage from the input source is below a preset level, the transistor switching circuit is actuated, energizing the relay coil, disabling the high voltage inverter and placing the low voltage inverter in the operative condition. Thus, the power supply circuits are positively controlled to prevent the high voltage from being applied to and damaging the circuit and circuit components of the low voltage inverter.

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawing in which the sole figure shows a novel power supply and control circuit partially in block diagram form.

The single figure shows a block diagram of a power supply circuit which may, for example, be utilized in connection with a two-way communication system for a railroad or the like in which the power supply is connected into a source of unidirectional voltage, not shown, the output of which is applied to a pair of input terminals 1—1. The unidirectional voltage impressed on the terminals 1 is first inverted to an alternating or square wave signal and the signal is then rectified to provide at the output terminals 3—3 a unidirectional voltage of a magnitude suitable for use as the B+ or other supply voltages for the various components of the communication equipment.

The unidirectional voltage impressed on input terminals 1—1 may, in typical railroad service, be either the 72 volt D.C. primary power at the diesel locomotive or 12 volt battery source at other locations on the train or at the trackside stations. Power supply 2 therefore includes a first high voltage inverter 4 which is adapted to invert the 72 volt supply to an alternating square wave output voltage and a corresponding low voltage inverter arrangement 5 which is adapted to invert the 12 volt supply. The D.C. supply voltage at terminals 1 is applied to a gate generator 6 which is common both to the high voltage inverter 4 and the low voltage inverter 5. Gate generator 6 is essentially a low power D.C. to A.C. inverter which operates from the unidirectional supply voltage to produce a series of square wave output pulses which are utilized to gate and control both the high and low voltage inverter circuits, the high and low voltage inverters are selectively connected to the gate generator through the operation of control relay 20 and its associated contacts and armatures, all of which are illustrated in the normally de-energized state.

Gate generator 6 is preferably of the type utilizing a pair of switching transistors and a saturable reactor element. The repetition frequency of the square wave pulses produced by the gate generator is determined by the time necessary for the saturable reactor associated with the transistor switches to change from saturation in one direction to saturation in the other direction. The volt-second characteristic of the core material of the saturable reactor establishes the time necessary for saturation to occur, and that in turn depends on the applied unidirectional voltage. Generating systems of this type are very well known in the art and no further description is needed here. For a detailed description of such transistorized square wave D.C. to A.C. inverters, reference is hereby made to Patent No. 2,783,384, Bright et al., issued February 26, 1957, as well as to chapter 22, pp. 443–454, of Junction Transistor Electronics, R. B. Hurley, John Wiley & Sons, Inc., New York, (1958).

In order to maintain the output repetition frequency of gate generator 6 constant with either 12 or 72 volts on the input terminals, a dropping resistance 7 is connected in series with one of the input terminals 1. Dropping resistance 7 is shunted by a relay operated contact 8 which, as will be explained in detail later, shorts out resistance 7 when 12 volts are impressed on terminals 1 and inserts it in series when 72 volts are applied to the input terminals. Dropping resistance 7 produces a sufficient voltage drop to maintain the input voltage to generator 6 constant for both input voltage levels thereby maintaining the pulse frequency constant.

The output of gate generator 6 is connected through armature 9 and normally closed relay contact 9a of control relay 20 to the input terminals of a differentiator 10 forming part of the high voltage inverter circuit 4. Differentiator 10 differentiates the square wave pulses of generator 6 to produce a series of short triggering pulses which are utilized to control a controlled rectifier inverter circuit, shown generally at 11.

The unidirectional input voltage impressed on terminals 1—1 is also applied to the controlled rectifier circuit 11 over leads 12—12, armature 13 and normally closed contact 13a of a relay circuit 20. Armature 13, as will be pointed out in greater detail later, is positioned against contact 13a whenever 72 volts are impressed on the input terminals and energizing voltage is thus applied to the controlled rectifier inverter circuit 11. Controlled rectifier 11, in effect, inverts or "chops" the applied 72 volt unidirectional voltage and converts it into a square wave output voltage which is applied to a rectifier circuit 14 to produce a unidirectional voltage at the output terminals 3 by converting the 72 volts D.C. to square waves in controlled rectifier inverter circuit 11. The amplitude of the square waves and hence the unidirectional output at terminals 3 may be amplified and raised to any desired level useful for providing energizing voltage for the communication device.

Controlled rectifier inverter circuit 11 may be of any suitable type and may include a single controlled rectifier or a pair of controlled rectifiers connected as parallel inverters operating to become alternately conducting to "chop" the applied D.C. voltage on lines 22. Circuitry for achieving this inversion by means of controlled rectifiers is old and well known in the art and need not be described here. For purposes of completeness of the description of the invention and its environment, reference is hereby made to chapter 8 entitled "Circuits Operating From D.C. Power" of The Controlled Rectifier Manual, published by the General Electric Company, first edition (1960), and Figures 8.26 and 8.29 which illustrate parallel inverter circuits and Figures 8.18 and 8.19 which illustrate circuits utilizing but a single controlled rectifier.

The pulse output from differentiator 10, as will be appreciated by those skilled in the art, is applied to the gating electrodes of the controlled rectifiers of circuit 11 to cause these to become conducting and thereby produce the desirable square wave output voltages.

When operating from a 12 volt D.C. source, power supply 2 is so designed that high voltage inverter 4 is disabled and low voltage inverter 5 is placed in operative condition to invert the 12 volts input voltage to an alternating square wave which is rectified to produce a unidirectional output voltage at terminals 3. Low voltage inverter circuit 5 includes a transistor inverter or "chopper" arrangement 14 which inverts or "chops" the unidirectional voltage supplied from terminals 1—1 over leads 15—15 and relay operated contact 17. The square wave gate signals from gate generator 6 are applied to inverter 14 through contact 9b to produce a square wave at the output of inverter 14 which is applied to rectifier and filter circuits 14 to produce the output voltage $V_0$, etc. Circuit 14 may typically be an inverter or chopper circuit such as illustrated in Fig. 9-0.16 of Navships 93484 entitled "A Handbook of Selected Semiconductor Circuits" published by the Bureau of Ships, Department of the Navy and printed by United States Government Printing Office (1960). In a circuit of this type, a pair of power transistors are utilized as switching devices to connect the D.C. voltage alternately to the output terminals. The gating signals from generator 6 are utilized to switch conduction of the power transistors cyclically thereby "chopping" the unidirectional voltage into square waves.

Since power supply 2 is designed to operate from either 12 or 72 volt D.C. sources by selectively connecting high voltage inverter 4 or the low voltage inverter 5 to the sources, some means must be provided to make certain that the low voltage inverter is never connected to a line carrying 72 volts. In the absence of such a protective arrangement the low voltage inverter may be severely damaged by the inadvertent application of the high voltage. To this end, a protective circuit is provided which samples the applied input voltage and selectively switches one or the other of the inverter circuits to the input terminal. Furthermore, the protective circuit operates in such a fashion that the high voltage inverter 4 is in the operative condition in the absence of any input to the power supply so that upon first connecting power supply 2 to the source via plug-in connectors 19, the high voltage inverter is always in the operative condition and the low voltage inverter is disabled and not subject to damage should the voltage on the supply line be 72 volts.

Protective circuit 18, broadly speaking, controls the movable armatures 8, 9, 13 and 16 which selectively connect either inverter 4 or inverter 5 to the input terminals 1—1. Armatures 8, 9, 13 and 16 form part of a transistor controlled solenoid relay 20. Solenoid coil 21 of relay 20 is connected in the base-emitter circuit of a p-n-p junction transistor 22 which includes an emitter 23, a base 24 and a collector 25. The D.C. input voltage from terminals 1—1 is connected via leads 26 and 27 across the collector-base circuit of transistor 22 to control the conductivity of the transistor and the energization of relay coil 21. Collector 25 is connected to input lead 26, and base 24 is connected to input lead 27 through a voltage reference element such as the Zener diode 28. Base 24 is also connected to lead 26 through a biasing resistor 29.

If the voltage at terminals 1—1 is below a certain level, preferably in the order of 12–15 volts, transistor 22 is forward biased through resistor 29 causing current to flow both in the emitter and collector circuits. This flow of current energizes coil 21. With coil 21 energized, relay armature 13 moves from contact 13a to 13b opening line 12 and removing supply voltage from the controlled rectifiers of inverter circuit 11. Similarly, armature 9 moves from contact 9b to 9a removing the gating signals from differentiating circuit 10 and applying it to inverter chopper 15. Armature 16 moves from contact 17a to contatc 16b closing line 16 and applying the 12 volt D.C. supply to inverter 14 to produce the square wave at its output. Simultaneously, armature 8 closes shorting out dropping resistance 7 and supplying 12 volts D.C. directly to gate generator 6.

In the event that the voltage at input terminals 1—1 is above the predetermined level, which level may, as pointed out previously, be a few volts greater than 12 volts, the reverse breakdown voltage of Zener diode 28 is exceeded and a large reverse current flows. The reverse current from Zener diode 28 flows through biasing resistance 29 producing a voltage drop which opposes the forward biasing due to the input voltage at leads 26 and 27. The potential drop due to the reverse current flow is large enough to reverse bias transistor 22 into the nonconducting state, thereby de-energizing relay coil 21. Armatures 8, 9, 13 and 16 return to contacts 8a, 9a, 13a and 16a respectively disconnecting low voltage inverter 5 and connecting high voltage inverter 4. It will also be apparent that in the absence of supply voltage at terminals 1—1, there are no biasing voltages whatever for transistor 22, which is, therefore, in the non-conducting inoperative state. Relay coil 21 is de-energized and the various armatures 8, 9, 13, and 17 are positioned against contacts 8a, 9a, 13a and 17a, respectively, thus connecting high-voltage inverter 4 to the input terminals. The system is, therefore, protected against the damage to the low-voltage inverter when the system is first energized.

In operation, when the equipment including the power supply is initially connected to the D.C. source via plug-in connectors 18, coil 21 is in the de-energized state since transistor 22 has no energizing voltage impressed on it. Armatures 8, 9, 13 and 16 are, therefore, at contacts 8a, 9a, 13a and 16a respectively. Energizing voltage is, therefore, applied to controlled rectifier inverter circuit 11 over lines 12 and gating signals from generator 6 are applied to differentiator 10 to provide triggering pulses for the controlled rectifiers of circuit 11. In other words, high voltage inverter 4 is in operative condition. Similarly, the low voltage inverter circuit 5 is positively disabled as there is no supply voltage applied to inverter circuit 15 since armature 17 of the relay is positioned against contact 17a, and there are no gating signals from generator 6. Consequently, the high voltage inverter is always connected for operation when the unit is first plugged in thereby eliminating the risk of damaging the low voltage inverter by inadvertently connecting it to a supply line which has high voltage on it.

If the voltage on the supply line connected to input terminals 1—1 is 72 volts, high voltage inverter circuit 4 remains connected to the source and functions in the usual manner since Zener diode 28 immediately draws reverse current as it reverse breakdown voltage has been greatly exceeded. Transistor 22 is, therefore, reverse biased by the flow of the reverse current through resistor 29 and relay coil 21 remains de-energized.

If, on the other hand, the voltage at terminals 1—1 is in the order of 12 volts or so, the reverse voltage on Zener diode 28 is less than the reverse breakdown voltage and the diode does not conduct. Transistor 22 is, therefore, forward biased through resistor 29 and is fully conducting. The flow of emitter current energizes relay coil 21 thereby moving armatures 8, 9, 13 and 16 from contacts 8a, 9a, 13a and 16a to contacts 8b, 9b, 13b and 16b respectively. Energizing voltage is thereby removed from inverter circuit 11 and applied to transistor inverter 14 and the gate signals switched from differentiator 10 to inverter 14. Simultaneously, dropping resistance 7 is shorted to maintain the frequency of gate signals from generator 6 constant in spite of the change in the level of the input unidirectional voltage to the generator. Low voltage inverter circuit 5 is thus connected to the supply line and high voltage inverter 4 disconnected from the line.

It will be appreciated that the utility of protective circuit 19 shown in FIG. 1 is not limited to use in connection with a power supply. It is obvious that it is capable of many and varied uses in any number of environments. For example, the circuit may obviously be used as part of an under-voltage relay. The instant invention is, therefore, not to be limited to a dual voltage power supply but is of general utility.

While a particular embodiment of this invention has been shown and described above, the invention is in no way limited thereto, since many other modifications both in the circuit arrangement and in the instrumentalities employed may be made. It is contemplated by the appended claims to cover any such modifications which fall within the true spirit and scope of this invention.

What is claimed as new and desired to be secured by Letters Patent is:

1. In a power supply adapted to operate from unidirectional supply voltages of different magnitudes, which includes protective circuitry to avoid damage to components of the power supply from over voltages, the combination of a high voltage solid state static D.C. to A.C. inverter, a low voltage solid state static D.C. to A.C. inverter, input terminals adapted to have unidirectional voltages of different magnitudes impressed thereon, control means for insuring that the said high voltage static inverter is coupled to said input terminals whenever supply voltages are first impressed on said input terminals and for selectively connecting said low voltage and high voltage inverters to said terminals in response to the magnitudes of the supply voltage including:

(a) switching means coupled to said input terminals and responsive to the supply voltage for selectively coupling the high and low voltage inverters to said input terminals, said switching means when in the de-energized state always coupling said high voltage inverter to said terminals so that upon energization of the power supply the low voltage inverter is protected against damage from inadvertent application of high voltages; and (b) voltage sensing means responsive to the voltage level at said input terminals for energizing said switching means whenever the supply voltage is below a predetermined magnitude to remove said high voltage inverter from said terminals and couple said low level inverter thereto.

2. A power supply, according to claim 1, wherein said switching means include a relay, plurality of relay operated contact means for selectively energizing one or the other of said inverters by connecting them to said terminals, said relay being energized by said voltage sensing means whenever the supply voltage is below a predetermined magnitude.

3. A power supply, according to claim 2, wherein said voltage sensing means include a transistor having a pair of input electrodes and a pair of output electrodes, said relay being connected in circuit with said output electrodes and the input electrodes being coupled to said input terminals to bias said transistor into conduction and energize said relay whenever the voltage is below a predetermined element, and voltage reference means coupled to one of said input electrodes to bias said transistor into the nonconducting state to de-energize said relay whenever said voltage at said input terminals exceeds the predetermined magnitude.

References Cited by the Examiner

UNITED STATES PATENTS

| | | | |
|---|---|---|---|
| 2,322,955 | 6/1943 | Perkins | 321—27 X |
| 2,703,376 | 3/1955 | Board | 321—2 |
| 2,888,631 | 5/1959 | Munson et al. | 321—49 |
| 2,959,717 | 11/1960 | Conger | 317—33 |
| 3,014,159 | 12/1961 | Frank | 317—33 |
| 3,047,776 | 7/1962 | Mauer | 317—33 X |
| 3,081,437 | 3/1963 | Radcliffe. | |
| 3,082,369 | 3/1963 | Landis | 321—45 |
| 3,085,190 | 4/1963 | Kearns et al. | 321—45 |

LLOYD McCOLLUM, Primary Examiner.

G. J. BUDOCK, J. C. SQUILLARO, Assistant Examiners.